(12) United States Patent
Kirchhoff et al.

(10) Patent No.: US 12,047,709 B2
(45) Date of Patent: Jul. 23, 2024

(54) DEVICE FOR MONITORING THE SURROUNDINGS OF A VEHICLE

(71) Applicant: ZF Friedrichshafen AG, Friedrichshafen (DE)

(72) Inventors: Johannes Kirchhoff, Colnrade (DE); Alex Hessel, Lemförde (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/280,743

(22) PCT Filed: Sep. 25, 2019

(86) PCT No.: PCT/EP2019/075807
§ 371 (c)(1),
(2) Date: Mar. 26, 2021

(87) PCT Pub. No.: WO2020/064800
PCT Pub. Date: Apr. 2, 2020

(65) Prior Publication Data
US 2021/0344874 A1  Nov. 4, 2021

(30) Foreign Application Priority Data
Sep. 26, 2018 (DE) .......................... 102018216460.6

(51) Int. Cl.
*B60R 11/04* (2006.01)
*B60R 1/26* (2022.01)
(Continued)

(52) U.S. Cl.
CPC ................. *H04N 7/18* (2013.01); *B60R 1/26* (2022.01); *B60R 11/04* (2013.01); *H01Q 1/32* (2013.01);
(Continued)

(58) Field of Classification Search
CPC ............... B60R 11/04; B60R 2011/004; B60R 2011/0082; B60R 1/00; B60R 2300/8046;
(Continued)

(56) References Cited

U.S. PATENT DOCUMENTS

| 5,971,552 A | 10/1999 | O'Farrell et al. |
| 10,074,894 B1 | 9/2018 | Birnbaum et al. |

(Continued)

FOREIGN PATENT DOCUMENTS

| CN | 2747111 Y | 12/2005 |
| CN | 106255618 A | 12/2016 |

(Continued)

OTHER PUBLICATIONS

International Search Report and Written Opinion of the International Search Authority mailed Nov. 26, 2019 in International Application No. PCT/EP2019/075807 (English and German languages) (14 pp.).

(Continued)

*Primary Examiner* — Behrooz M Senfi
(74) *Attorney, Agent, or Firm* — Crowell & Moring LLP

(57) ABSTRACT

A device for monitoring the surroundings of a vehicle may be secured to the vehicle. In one example, the device comprises a fixture and a swivel arm that is movable relative to the fixture and connected thereto. The fixture has a fastening portion for fastening the device to a body part of the vehicle and is shaped to receive at least one camera. The swivel arm is shaped to receive an antenna.

20 Claims, 3 Drawing Sheets

(51) Int. Cl.
 *H01Q 1/32* (2006.01)
 *H04N 7/18* (2006.01)
 *H04N 23/54* (2023.01)
 *B60R 11/00* (2006.01)

(52) U.S. Cl.
 CPC ........ *H04N 23/54* (2023.01); *B60R 2011/004* (2013.01); *B60R 2011/0082* (2013.01); *B60R 2300/8046* (2013.01)

(58) Field of Classification Search
 CPC .......... G08G 1/165; G08G 1/166; H01Q 1/32; H04N 5/2253; H04N 7/18
 USPC ........................................................ 348/148
 See application file for complete search history.

(56) References Cited

U.S. PATENT DOCUMENTS

| | | | |
|---|---|---|---|
| 11,738,696 B2 * | 8/2023 | Kirchhoff et al. ...... | B60R 11/04 348/148 |
| 2003/0026009 A1 * | 2/2003 | Vandenbrink .......... | B60R 1/078 359/877 |
| 2003/0090820 A1 * | 5/2003 | Matsuura ................. | B60R 1/04 359/872 |
| 2004/0201536 A1 | 10/2004 | Ohara et al. | |
| 2009/0040306 A1 | 2/2009 | Foote et al. | |
| 2012/0293316 A1 * | 11/2012 | Johnson ................ | E02F 9/2087 340/438 |
| 2015/0172518 A1 | 6/2015 | Lucas et al. | |
| 2016/0001701 A1 * | 1/2016 | Pagliani ................ | E02F 9/2033 701/301 |
| 2017/0057423 A1 | 3/2017 | Wang | |
| 2017/0166130 A1 * | 6/2017 | Foote ................. | H04N 5/23293 |
| 2017/0182943 A1 | 6/2017 | Hoenninger | |
| 2020/0317196 A1 * | 10/2020 | Yoshida .............. | B60W 30/181 |

FOREIGN PATENT DOCUMENTS

| | | | | |
|---|---|---|---|---|
| DE | 2627749 A1 | | 12/1976 | |
| DE | 102004021581 A1 | * | 12/2005 | ........... B60Q 1/2665 |
| DE | 10 2010 064 080 A1 | | 6/2012 | |
| DE | 10 2012 015 395 B3 | | 11/2013 | |
| DE | 102014005803 | * | 9/2015 | ............. B60R 11/02 |
| DE | 102016209927 A1 | * | 12/2017 | ............... B60R 1/00 |
| DE | 102018119663 A1 | * | 2/2019 | ......... G06K 9/00791 |
| EP | 2 774 815 A1 | | 9/2014 | |
| JP | 2005080183 A | * | 3/2005 | ............. H01Q 1/22 |
| KR | 1020100123435 | | 11/2010 | |
| WO | WO-9001853 A | * | 2/1990 | ............... B60R 1/00 |
| WO | WO 2006/038274 A1 | | 4/2006 | |
| WO | WO-2006038274 A1 | * | 4/2006 | ............... B60R 1/06 |
| WO | WO 2016/048141 A1 | | 3/2016 | |

OTHER PUBLICATIONS

Office Action with Search Report (and English translation) in Corresponding Chinese Application No. 201980062437.9, dated Nov. 11, 2023 (21 pages).

Second Office Action in Corresponding Chinese Application No. 201980062437.9, dated Apr. 19, 2024, with English translation (18 pages).

* cited by examiner

DEVICE FOR MONITORING THE SURROUNDINGS OF A VEHICLE

RELATED APPLICATION

This application is a filing under 35 U.S.C. § 371 of International Patent Application PCT/EP2019/075807, filed Sep. 25, 2019, and claiming priority to German Patent Application 10 2018 216 460.6, filed Sep. 26, 2018. All applications listed in this paragraph are hereby incorporated by reference in their entireties.

TECHNICAL FIELD

The present disclosure relates to a device for monitoring a vehicle's environment and a vehicle with at least two such devices, located on opposite sides of the vehicle body.

BACKGROUND

Various means can be used to help a vehicle driver monitor road traffic. One of these means comprises mirrors in and on the sides of the vehicle for monitoring the vehicle's environment. It is possible to replace the mirrors with cameras, which, used in combination with a screen, provide the driver with images of the observed environment.

DE 10 2010 064 080 A1 discloses a driver assistance system for a vehicle that comprises a camera integrated in a roof antenna on the vehicle.

US 2017/0057423 A1 relates to a camera system used in a motor vehicle.

A camera arm for a mirror replacement system camera in a motor vehicle is disclosed in DE 10 2012 015 395 B3.

Detection of a trailer's environment that is coupled to a motor vehicle is obtained in US 2015/0172518 A1 using at least one camera mounted on the trailer.

With this background, the present disclosure relates to an improved device for monitoring a vehicle's environment and an improved vehicle.

BRIEF DESCRIPTION OF THE DRAWINGS

Certain embodiments shall be explained in greater detail in reference to the attached drawings. Therein.

DETAILED DESCRIPTION

Figure 1:
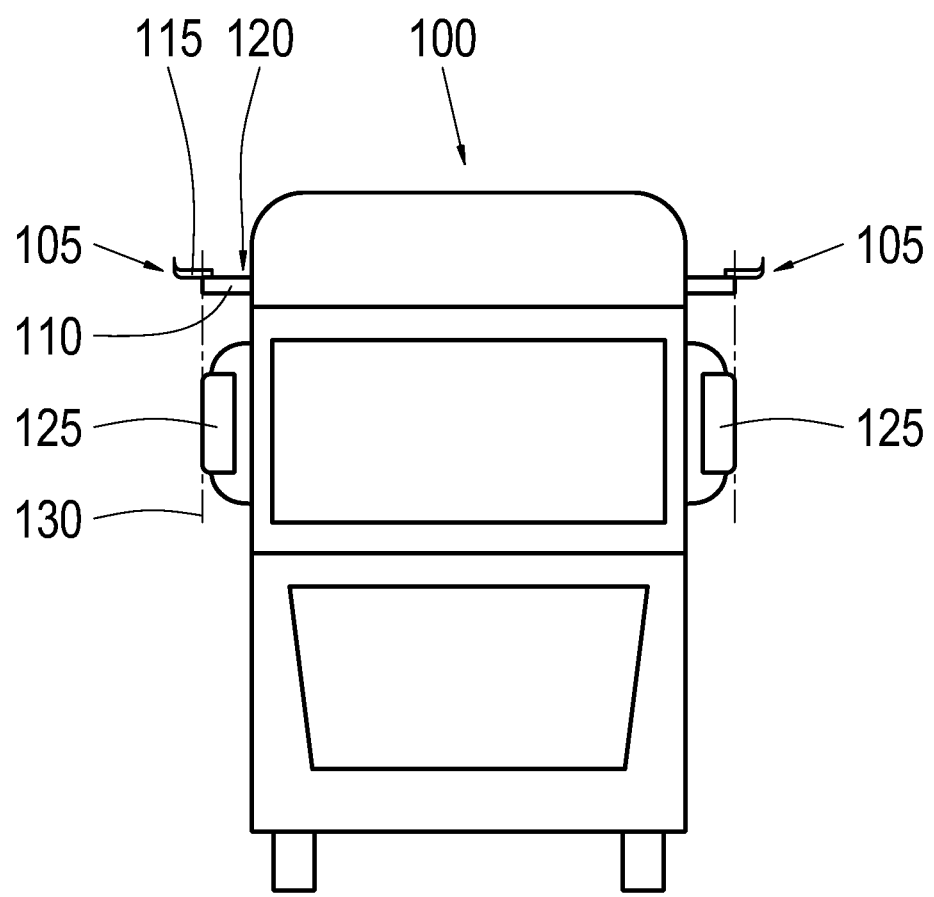
FIG. 1 shows a schematic illustration of a vehicle that has at least two devices for monitoring a vehicle's environment according to an exemplary embodiment.

Certain embodiments of the present disclosure are based on the knowledge that it is possible to replace a mirror on a vehicle with a device containing a camera for monitoring the vehicle's environment and an antenna for exchanging vehicle parameters. The camera can be in a part of the device that is rigidly connected to the vehicle, and the antenna can be in a part of the device that can move. This results in an advantageously compact device while also making it possible to space the camera and antenna apart, to reduce electromagnetic interference.

A device for monitoring a vehicle's environment is proposed. The device comprises a mount and a boom connected to the mount that can move in relation thereto. The mount has an attachment point for attaching the device to a part of the vehicle body, and can be used for at least one camera. An antenna can be accommodated in the boom.

The vehicle can be a motor vehicle, e.g. an automobile, bus, utility vehicle, or a vehicle for transporting goods or people. The vehicle can be a partially or fully autonomous vehicle. The device can be used in a camera-monitor system in the vehicle, or for an electronic exterior mirror. In addition, the device can be referred to as an electronic mirror module, "eMirrorModule," or an electronic exterior mirror. The mount can be designed for one or more cameras. The mount can also be designed to contain one or more lines from the at least one camera to an interface for a control unit and a power source in the vehicle. The device can be rigidly connected at the attachment point, e.g. in a material-bonded or force-fitting manner, to the part of the vehicle body, e.g. a section of the lateral frame thereof. The boom is attached to the mount such that it can rotate, fold or bend in relation thereto. The camera that can be mounted therewith can be configured to observe the vehicle's environment at the side, underneath, and/or behind the vehicle. The camera can also be configured to observe a driving lane as part of a lane keeping function. The antenna on the boom can be a Wi-Fi antenna or a GPS antenna.

According to one embodiment, the device can comprise the at least one camera and/or the antenna. The antenna can be designed for wireless communication. The antenna can also be designed to receive position data for determining a current location. The antenna can be a Wi-Fi antenna or an UMTS antenna for wireless data transfer, configured to enable vehicle-to-vehicle communication (Car2Car communication). In order to receive position data, the antenna can be designed to receive a position signal from a satellite or an infrastructure assembly. The device can therefore advantageously contain one or more cameras for assisting the driver in a vehicle in monitoring the vehicle environment, as well enabling vehicle data transfer. The use of the at least one camera and the antenna can advantageously contribute to increasing driving and traffic safety.

The boom can be located on a side of the mount opposite the attachment point. This is advantageous in terms of enabling the boom to move in relation to the mount, in a space saving manner, while maintaining a distance between the antenna on the boom and metal components in the device or on the vehicle, to prevent effects to the antenna caused by metal surfaces.

The boom can also have a horn-shaped extension on a side opposite the mount, according to one embodiment. The antenna can be located in the extension. A horn-shaped extension is advantageous in terms of obtaining a perpendicular orientation of the antenna in a space saving manner. With this arrangement, it is advantageously possible to increase the transmission and reception quality of the antenna.

The boom can also be designed, according to one embodiment, such that it can be folded up against the mount, or folded into the mount. For this, the boom can be attached at one end to the mount, such that it can be folded down and away from, or up and against, the mount on a pivoting or folding mechanism. In addition, the mount can have a recess into which the boom can be folded. The boom can be designed such that when the device is in operation, it is folded out, and when the device is not in use, it folds in, against the mount. The folding out or in can take place in response to an electric signal, or it can be obtained through a mechanical force acting on the boom. Advantageously, it is therefore possible to fold the boom against the mount when the vehicle needs to move about in a tight space.

The boom can extend beyond the mount when folded out. This is advantageous with regard to being able to connect the boom to the mount in a space saving manner, while still maintaining a distance between the antenna in the boom and other components in the device.

The boom can also contain a pivoting mechanism according to one embodiment. By using the pivoting mechanism, the boom can be moved back and forth between a folded-out state and a folded-in state. The pivoting mechanism can contain at least one supply line leading from the antenna in the boom to the mount. This advantageously protects the at least one supply line when the boom is being moved. The pivoting mechanism also advantageously reduces wear when moving the boom in relation to the mount.

According to this exemplary embodiment, the boom is also flexible, such that it can move in relation to the mount. In order for the boom to be flexible, the antenna and all of its cables are coated with an elastic material. The flexible boom can be folded in and out. The flexible boom can then be attached to the mount. The movement of the boom in relation to the mount is thus advantageously economical and can be easily realized. In particular, there is no need for a pivoting mechanism.

A vehicle is also proposed herein. The vehicle contains at least two embodiments of the device described above, located on opposite sides of the vehicle body. The mounts for each of the devices are connected at their attachment points to the vehicle body. The at least two embodiments of the device can be identical. The at least two devices can be mounted on the vehicle in addition to or instead of side mirrors. The width of the device when the boom is folded out can correspond to the width of a commercially available side mirror when it is folded in.

In the following descriptions of preferred exemplary embodiments of the present invention, the same or similar reference symbols are used for elements acting in similar ways depicted in the various figures, and the descriptions of these elements shall not be repeated.

FIG. 1 shows a schematic illustration of a vehicle 100 that has at least two devices 105 for monitoring a vehicle's 100 environment according to an exemplary embodiment. The vehicle 100 is shown from the front. The vehicle 100 has at least two devices 105 on opposite sides of the vehicle's 100 body. The two devices 105 can be identical, or two different exemplary embodiments of the device 105 described below can be mounted on the vehicle 100.

The device 105 comprises a mount 110 and a boom 115 connected thereto, that can move in relation to the mount 110. The mount 110 has an attachment point 120 for attaching the device to a part of the vehicle's 100 body. The mount 110 is also designed to accommodate at least one camera. The boom 115 is designed to accommodate an antenna.

According to one exemplary embodiment, when the device 105 is mounted on the vehicle 100, it comprises at least one camera. Additionally or alternatively, the device 105 comprises the antenna. The at least one camera is located in the mount 110, and the antenna is located in the boom 115.

When the device 105 is mounted on the vehicle, as shown herein, the mount 110 is connected to the part of the vehicle's 100 body at the attachment point 120. In this figure, the mount 110 is connected, by way of example, to a section of a lateral frame of the body of the vehicle 100. According to one exemplary embodiment, the mount 110 is rigidly connected to the part of the body of the vehicle 100.

The two devices 105 are mounted on the vehicle 100 in addition to two side mirrors 125 in this example. The length of the mount 110 corresponds to the width of the side mirror when it is folded in here, as indicated by the marking 130. This illustrates the compactness of the device 105.

According to one exemplary embodiment, the boom 115 can be folded down against the mount 110, from the folded-out state shown in FIG. 1 to a folded-in state. When folded in, the distance between the free end of the boom 115 and an opposite part of the body of the vehicle 100 can be less than or equal to the length of the mount 110. This is enabled, by way of example, by a pivoting mechanism between the mount 110 and the boom 115. According to an alternative exemplary embodiment, the mount 110 and the boom 115 are rigidly connected to one another, but the boom 115 is flexible, and can thus move in relation to the mount 110, and can therefore be folded down. In this case, when folded in, the distance between the free end of the boom 115 and the opposite part of the body of the vehicle 100 can be less than, equal to, or slightly greater than, e.g. less than 2 cm greater than, the length of the mount 110. According to another exemplary embodiment, the mount 110 and the boom 115 are pivotally connected to one another via a pivoting mechanism, and the boom 115 is also flexible.

The side mirrors 125 and the interior mirror in a vehicle are used provide the driver with a rear view, and therefore assist in monitoring the vehicle environment. An exemplary embodiment of the device 105 shown here can be used in addition to or instead of a mirror. The at least one camera can be contained in the mount 110 for this. Content recorded by the camera can be displayed to the driver of the vehicle 100 on one or more screens. The driver is also assisted by software-based object recognition, which may issue a warning, for example, when people or objects are detected.

Figure 2:
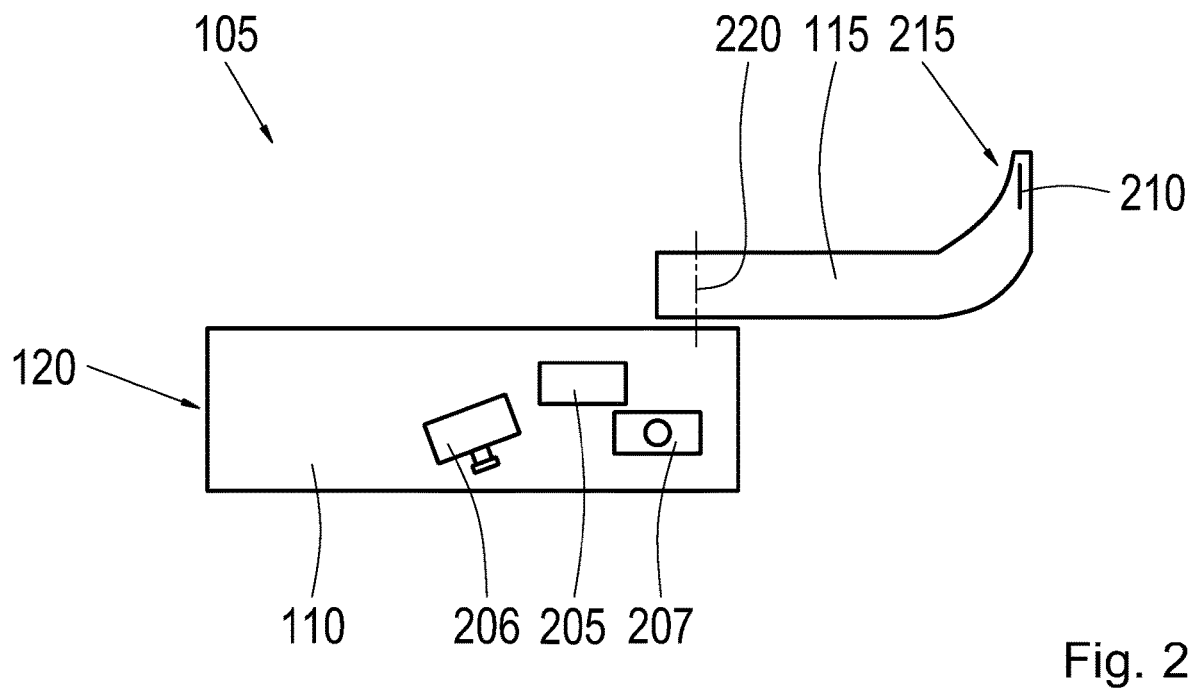
FIG. 2 shows a schematic illustration of a device for monitoring a vehicle's environment according to an exemplary embodiment.

FIG. 2 shows a schematic illustration of a device 105 for monitoring a vehicle's 100 environment according to an exemplary embodiment. The device 105 is shown from the front, and is similar, or corresponds, to the device shown in FIG. 1, comprising the mount 110, boom 115 and attachment point 120.

According to the exemplary embodiment shown herein, the mount 110 comprises a first camera 205, second camera 206, and third camera 207. The first camera 205 is configured to record the fields of vision of one or more main outer rear view mirrors and a wide angle outer rear view mirror, as established in the guideline 2003/97/EG. The first camera 205 is accordingly also designated as a "class II, III, and IV camera." The second camera is configured to record the field of vision of an oncoming traffic outer mirror, as established in guideline 2003/97/EG. A viewing axis of the second camera 206 is nearly perpendicular to the surface of the street when the device 105 is in the monitoring mode. The second camera 206 is therefore also designated as a "class V camera." The third camera 207 is configured as a camera for lane keeping assistance, and is therefore designated as a "lane keep assist camera." The device 105 can also comprise just one or two of the aforementioned cameras 205, 206, 207.

According to the exemplary embodiment shown here, the boom 115 comprises an antenna 210. The antenna 210 is configured for wireless communication and/or to receive position data for determining a current location. In this case, the antenna 210 is a Wi-Fi antenna, by way of example. Alternatively, the boom 115 can also comprise a GPS antenna. The antenna 210 is configured for vehicle-to-vehicle communication, also referred to as V2V communication, for exchanging vehicle parameters. As a result, if a forward vehicle brakes, a signal can be sent to the vehicle behind it, such that it can automatically react to the braking, and brake as well. This contributes to safety in road traffic.

According to the exemplary embodiment shown here, the boom 115 is also located on side of the mount 110 lying opposite the attachment point 120. As a result, the distance between the attachment point 120 and the boom 115 is increased, in order to obtain a spacing between the antenna 210 in the boom 115 and metal components in the vehicle and the device 105. The antenna 210 is also located on an end of the boom 115 that is further away from the mount 110 than the other end of the boom 115 when the boom is folded out.

The boom 115 also has a horn-shaped extension on its side facing away from the mount 110 according to the exemplary embodiment shown here. The antenna 210 is located in the extension 215. This shape of the boom 115 and location of the antenna 210 also results in a spacing between the antenna 210 and other components in the device 105.

According to the exemplary embodiment shown here, the boom 115 extends beyond the mount 110 when it is folded out. For this, the boom 115 is connected to the mount 110 by means of a pivoting or folding mechanism, and designed to extend laterally from the mount 110 in the folded-out state, as shown here. The boom 115 can also be designed to extend above or below the mount, when the device 105 is mounted on the vehicle.

The boom 115 according to the exemplary embodiment shown here also has a pivoting mechanism. The pivoting mechanism is designed to move the boom about the point of rotation 220. Furthermore, the boom 115 is designed to contain a supply line from the antenna 210 in the boom 115 to the mount 110.

According to one exemplary embodiment, the boom 115 is also designed such that it can be folded against the mount 110 or into the mount 110. The boom is moved about the point of rotation 220 for this, e.g. by means of the pivoting mechanism, and folded against the mount 110. Alternatively, the mount 110 can also contain a recess corresponding to the dimensions of the boom 115, into which the boom 115 can be folded. This reduces the overall size of the device 105, e.g. to enable the vehicle to move in tight spaces, when the device 105 is mounted thereon.

The mobility of the boom 115 in relation to the mount 110 is advantageous in terms of preventing distortion of the signals from the antenna 210 located in the boom 115. It is also advantageous for the cameras 205, 206, 207 to be located in the mount 110 rigidly connected to the vehicle, and not in a pivoting or articulated part of the device 105, because lines from the cameras 205, 206, 207 do not need to pass through a point of rotation as a result, which could lead to breakage in the course of a pivoting or folding procedure due to bending and torsional forces acting on the lines.

Figure 3:
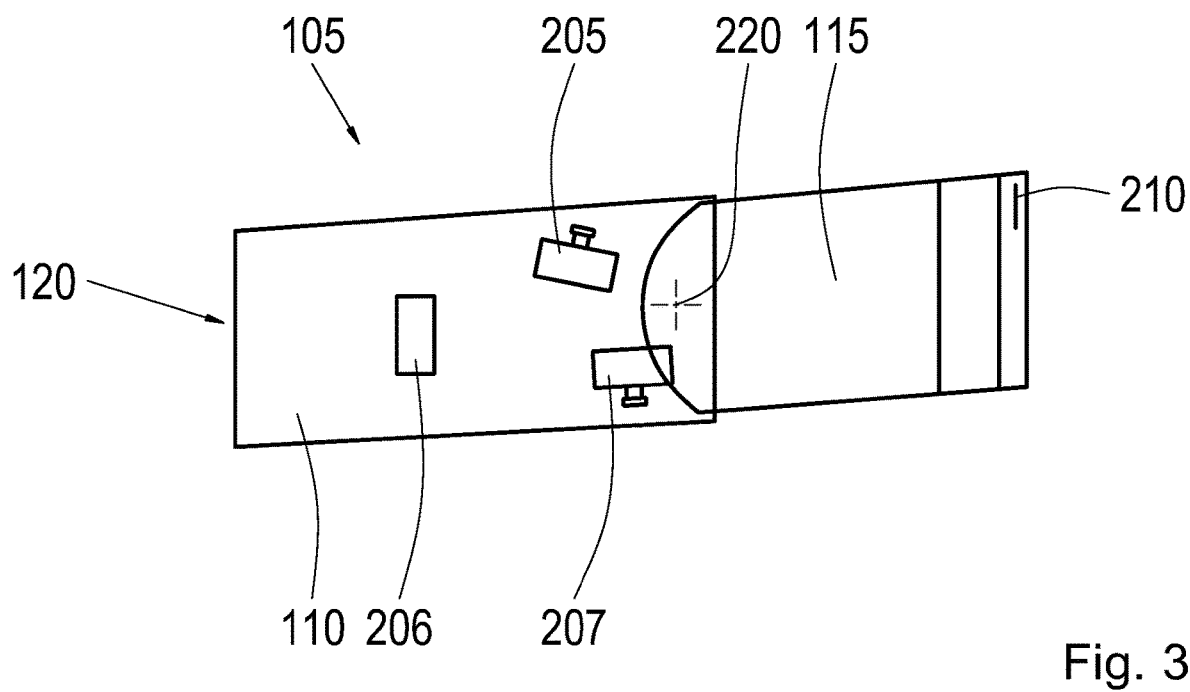
FIG. 3 shows a schematic illustration of a device for monitoring a vehicle's environment according to an exemplary embodiment.

FIG. 3 shows a schematic illustration of a device 105 for monitoring a vehicle's environment according to an exemplary embodiment. The device 105 is shown from above. The device 105 shown here substantially corresponds to the device described in reference to the preceding figures, with the exception of the shape of the boom 115. The boom 115 is also located opposite the attachment point 120, and can be folded away from the mount 110, but the boom 115 does not have the horn-shaped extension, and does not extend beyond the mount 110. In the exemplary embodiment shown here, the boom 115 is connected at one end to the end of the mount 110 lying opposite the attachment point 120, overlapping it there. The point of rotation 220 for the pivoting mechanism is located in this overlapping area. Adjoining this overlapping area, the boom is rectangular. The width of the boom 115 is greater than one half of the length of the mount 110. The antennas are accommodated at an end of the boom 115 lying opposite the overlapping area.

Figure 4:
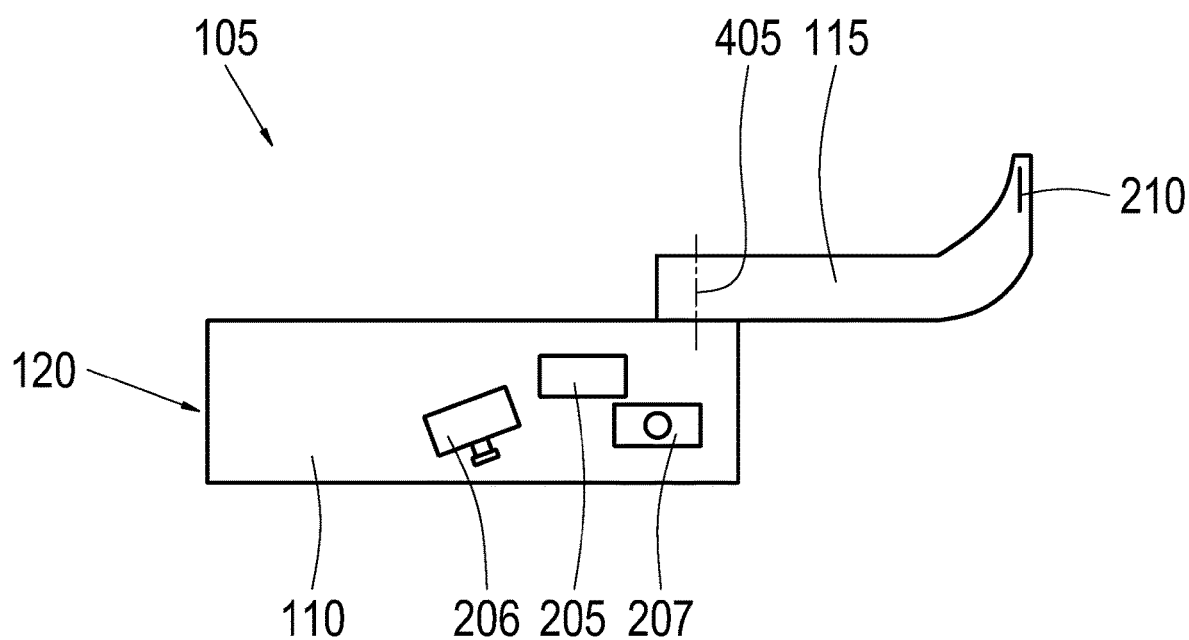
FIG. 4 shows a schematic illustration of a device for monitoring a vehicle's environment according to an exemplary embodiment.

FIG. 4 shows a schematic illustration of a device for monitoring a vehicle's environment according to an exemplary embodiment. The device 105 is shown from the front. The device 105 shown here is similar to the device described in reference to FIG. 2. According to this exemplary embodiment, the boom 115 is secured on the mount 110 via an attachment 405. The attachment 405 can be obtained with a pin or screw connection. Alternatively, the mount 110 and the boom 115 can be connected to one another via a material bonding. For this, the mount 110 and the boom 115 can come in contact in an overlapping area, and be glued to one another, for example. According to one exemplary embodiment, the mount 110 and the boom 115 are rigidly connected to one another.

According to this exemplary embodiment, the boom 115 is also flexible, such that it can move in relation to the mount 110. In order for the boom 115 to be flexible, the antenna 210 and all of its cables are coated with an elastic material. The boom 115 is connected to the mount 110 without the pivoting or folding mechanism. When subjected to a mechanical pressure, the boom 115 is bent, and can thus be moved in relation to the mount 110. In this manner, the boom 115 can be folded-in mechanically, in order to enable the vehicle to move in tight spaces when the device 105 is mounted thereon, without the need for a pivoting or folding mechanism for moving the boom 115.

If an exemplary embodiment contains an "and/or" conjunction between a first feature and a second feature, this can be read to mean that the exemplary embodiment according to one embodiment contains both the first feature and the second feature, and according to another embodiment, contains either just the first feature or just the second feature.

REFERENCE SYMBOLS 100 vehicle
105 device for monitoring a vehicle's environment
110 device mount
115 device boom
120 attachment point for the device
125 vehicle side mirror
130 marking for exemplary dimensions of the mount
205 first camera
206 second camera
207 third camera
210 antenna
215 horn-shaped extension of the boom
220 point of rotation
405 attachment of the boom to the mount

The invention claimed is:

1. A device for monitoring a vehicle's environment, the device comprising:
   a mount; and
   a boom connected to the mount, the boom having a distal end and a length that is less than a length of the mount;
   wherein the boom is moveable relative to the mount, wherein the mount has an attachment point configured to attach the device to a part of a body of the vehicle,
wherein the mount includes at least one camera, and
wherein an antenna is located at the distal end of the boom.

2. The device according to claim 1, wherein the device comprises at least one of the at least one camera and the antenna, and wherein the antenna is configured for at least one of wireless communication and to receive data for determining a current location.

3. The device according to claim 1, wherein the boom is located on a side of the mount lying opposite the attachment point.

4. The device according to claim 1, wherein the distal end of the boom has an extension that extends vertically above the mount, and wherein the antenna is located in the extension.

5. The device according to claim 1, wherein the boom is configured such that it can be folded against the mount or folded into the mount.

6. The device according to claim 1, wherein the boom has a pivoting mechanism, and wherein the pivoting mechanism includes at least one supply line leading from the antenna in the boom to the mount.

7. The device according to claim 1, wherein the boom is flexible such that it can move in relation to the mount.

8. A vehicle wherein the vehicle comprises the device according to claim 1, wherein the mount of the device is connected to the part of the body of the vehicle via the attachment point.

9. The vehicle of claim 8, further comprising a second device according to claim 1 located on an opposite side of the vehicle relative to the device.

10. A device for monitoring a vehicle's environment, the device comprising:
a mount having a length that is configured to correspond to a width of a side mirror of the vehicle when the side mirror is folded in; and
a boom connected to the mount, the boom having a distal end,
wherein the boom is moveable relative to the mount,
wherein the mount has an attachment point configured to attach the device to a part of a body of the vehicle,
wherein the mount is secured to at least one camera, and
wherein the distal end of the boom is secured to an antenna.

11. The device according to claim 10, wherein the antenna is configured for at least one of wireless communication and to receive position data for determining a current location.

12. The device according to claim 10, wherein the boom is located on a side of the mount lying opposite the attachment point.

13. The device according to claim 10, wherein the distal end of the boom has an extension that extends vertically above the mount, and wherein the antenna is located in the extension.

14. The device according to claim 10, wherein the boom is configured to be foldable against the mount or foldable into the mount, and wherein the boom, when folded against the mount or folded into the mount, extends a distance from the vehicle that is less than two centimeters greater than the length of the mount.

15. The device according to claim 10, wherein the boom has a pivoting mechanism, and wherein the pivoting mechanism includes at least one supply line leading from the antenna in the boom to the mount.

16. The device according to claim 10, wherein the boom is flexible such that it can move in relation to the mount.

17. A method, comprising:
securing a device for monitoring a vehicle's environment to the vehicle, the device comprising:
a mount having a length that is configured to correspond to a width of a side mirror of the vehicle when the side mirror is folded in; and
a boom connected to the mount, the boom having a distal end,
wherein the boom is moveable relative to the mount,
wherein the mount has an attachment point for attaching the device to a part of a body of the vehicle,
wherein the mount is secured to at least one camera, and
wherein the distal end of the boom is secured to an antenna.

18. The method according to claim 17, wherein the antenna is configured for at least one of wireless communication and to receive position data for determining a current location.

19. The device according to claim 13, wherein the extension is a horn-shaped extension.

20. The device according to claim 10, wherein the antenna is a vertical antenna.

* * * * *